United States Patent [19]

Bailey

[11] 3,875,568

[45] Apr. 1, 1975

[54] MAGNETIC BUBBLE CIRCUIT WITH HARD-SOFT OVERLAY

[75] Inventor: Paul Townsend Bailey, Creve Coeur, Mo.

[73] Assignee: Monsanto Company, St. Louis, Mo.

[22] Filed: May 7, 1974

[21] Appl. No.: 467,736

[52] U.S. Cl. 340/174 TF, 340/174 SR, 340/174 ZB

[51] Int. Cl. ........................ G11c 11/14, G11c 19/00

[58] Field of Search... 340/174 TF, 174 SR, 174 ZB

[56] References Cited

UNITED STATES PATENTS

| | | | |
|---|---|---|---|
| 3,523,286 | 8/1970 | Bobeck et al. | 340/174 TF |
| 3,541,535 | 11/1970 | Perneski | 340/174 TF |
| 3,815,107 | 6/1974 | Almasi | 340/174 TF |

*Primary Examiner*—Stanley M. Urynowicz, Jr.
*Attorney, Agent, or Firm*—Lane, Aitken, Dunner & Ziems

[57] ABSTRACT

A ferromagnetic overlay pattern for a field-accessed bubble chip includes successive linear segments of alternately high and low magnetic coercivity. The hard magnetic elements are given a predetermined polarity by an initial giant drive pulse. The soft magnetic elements are driven by intermittent pulses of insufficient amplitude to switch the hard elements. the circuit materials are chosen so that the temporary poles formed in the soft magnetic elements are stronger than those of the hard magnetic elements. When the periodic field is applied, bubbles move to the attracting poles of the soft elements. When the periodic field is off, the bubles move to the attracting poles of the hard elements. Propagation in opposite directions under the control of the same periodic field is described for parallel zigzag circuits of alternate hard-soft elements. Mutually exclusive orthogonal zigzag circuits enable selective propagation with different drive field alignments.

16 Claims, 12 Drawing Figures

MAGNETIC BUBBLE CIRCUIT WITH HARD-SOFT OVERLAY

BACKGROUND OF THE INVENTION

The invention relates generally to the field of magnetic bubble technology (MBT) and more particularly to propagation systems employing ferromagnetic overlays of different coercivity.

MBT involves the creation and manipulation of magnetic bubbles in specially prepared magnetic materials. The word "bubble" used throughout this text is intended to encompass any single-walled magnetic domain, defined as a domain having an outer boundary which closes on itself. The application of a static, uniform magnetic bias field orthogonal to a sheet of magnetic material having suitable uniaxial anisotropy causes the normally serpentine pattern of magnetic domains to shrink into isolated, short cylindrical configurations or bubbles whose common polarity is opposite that of the bias field. The bubbles repel each other and can be moved or propagated by a magnetic field in the plane of the sheet.

Many schemes exist for propagating bubbles along predetermined channels at a precisely determined rate so that uniform data streams of bubbles are possible in which the presence or absence of bubbles at a particular position within the stream indicates a binary 1 or 0. In conductor-accessed propagation systems electrically conductive loops on the sheet are pulsed to form consecutively attractive poles. In field-accessed systems a thin ferromagnetic overlay pattern is formed over the sheet and consecutive magnetic poles are induced in the elements of the pattern by a magnetic drive field in the plane of the sheet. Generally speaking, field-accessed systems have greater potential as propagation systems because they are easier to fabricate than conductor-accessed systems. Most field-accessed propagation circuits employ a uniformly rotating drive field in the plane of the sheet produced by an orthogonal pair of Helmholtz coils to which alternating current of opposite phase is applied.

Some circuits like the continuous, uniform zigzag circuit in U.S. Pat. No. 3,518,643 to Perneski, are driven by a repeating sequence of discrete drive field orientations. The Perneski patent describes a drive field for the zigzag circuit having three sequential orientations spaced by 45°.

Magnetically hard (high coercivity) circuit elements have rarely been used in the past in field-accessed circuit overlays since it is generally preferable to use highly permeable magnetic elements of low coercivity (e.g., permalloy) in order to reduce the strength of the drive field necessary to alternate the polarity of the elements of a given circuit. However, there are a few prior art examples of field-accessed circuit elements having different coercivity. A "hard-soft magnetic film gate" is shown in U.S. Pat. No. 3,599,190 to Smith and in Bonyhard et al., "Applications of Bubble Devices", *IEEE Trans. Mag.*, Vol. MAG-6, No. 3, pp. 447–451, Sept. 1970. These references describe a T-shaped element of a standard T-bar propagation system in which the upright portion of the T is formed with a magnetically hard laminate structure. The hard element can be switched by a large magnetic field and is not affected by the uniformly rotating magnetic field which operates the normal portions of the T-bar circuit.

U.S. Pat. No. 3,541,535 to Perneski illustrates a bubble propagation arrangement having repetitive patterns of overlay material of different coercivity. In particular, the latter Perneski patent shows discrete, parallel, bar-shaped elements with coorresponding opposite ends of alternately offset groups of parallel bars aligned to form a straight propagation path. The circuit is driven by a varying amplitude drive field of alternating polarity. As described by Perneski, bubble movement is carried out in response to an in-plane field growing in magnitude along a first direction parallel to the long dimension of the parallel elements and then growing in the opposite direction along that dimension. In the course of bubble propagation in the Perneski circuit, the bubble is stretched to cover like poles of adjacent but separate parallel elements. It should be particularly noted in Perneski that the polarity of the hard magnetic elements is switched during each cycle of the drive field. Accordingly, drive field pulses of relatively high amplitude are repeatedly applied during normal propagation with the Perneski circuits.

SUMMARY OF THE INVENTION

The general object of the invention is efficient bubble propagation by employing hard magnetic overlay elements that retain a given polarity during normal propagation.

According to the invention, a continuous ferromagnetic overlay circuit is composed of consecutive linear segments of alternate coercivity. The drive field system consists of an initial giant pulse to set all of the hard magnetic elements to a given polarity after which normal propagation is carried on by intermittent pulses of uniform amplitude and direction. The circuit materials and periodic drive field strength are selected such that the poles formed intermittently in the soft magnetic elements are of much greater magnetization than the poles retained by the hard magnetic elements.

In the preferred embodiment, propagation in opposite directions using the same drive field pulses is achieved for parallel zigzag circuits having corresponding, alternate hard-soft elements, and orthogonal zigzag circuits of this type are shown to be mutually exclusive in simple drive field sequences. The term "mutually exclusive" as used herein, refers to any one of at least two kinds of analogous circuits, where one kind of circuit propagates bubbles by means of a corresponding set of drive field pulses which does not propagate bubbles on the other kind of circuit, and vice versa, where both kinds of circuits bear the same geometrical relationship to the corresponding sets of field pulses which drive them. The preferred circuits exhibit a ratchet-like operation analogous to repetitively ascending a slope and falling over a cliff in a "relaxation" mode of operation.

DESCRIPTION OF THE PREFERRED EMBODIMENTS

Figure 1:
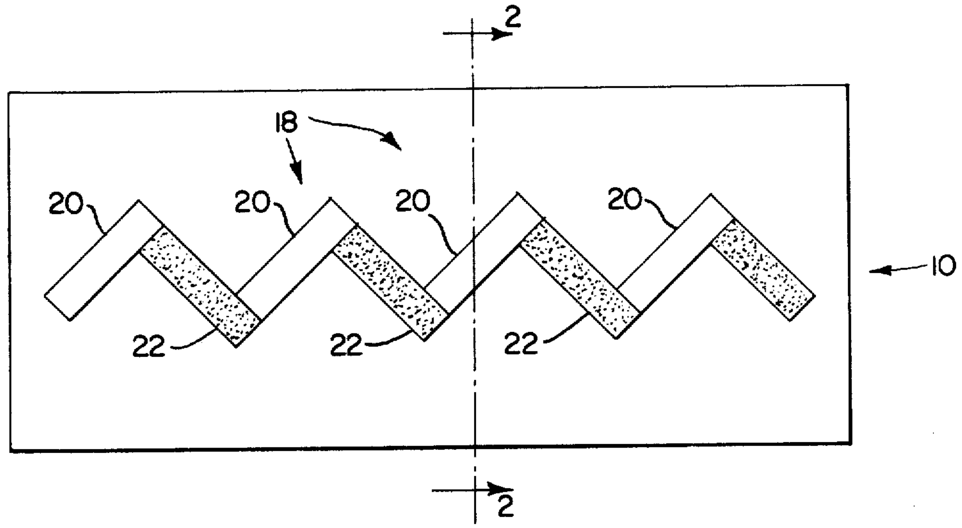
FIG. 1 is a plan view of a bubble chip having a hard-soft zigzag circuit according to the invention.
Figure 2:
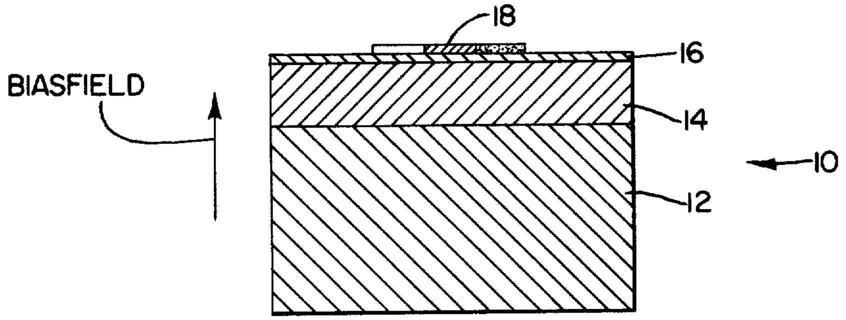
FIG. 2 is a sectional view of the bubble chip taken along lines 2—2 of FIG. 1.

In FIGS. 1 and 2 a bubble chip is shown in which a substrate 12 of nonmagnetic garnet, for example, supports an epitaxially grown magnetic bubble garnet layer 14 in which bubbles are maintained by a static orthogonal bias field. A thin spacing layer 16 typically of silicon oxide supports a zigzag overlay pattern 18 comprosed of alternately parallel linear segments 20 and 22 connected end-to-end. According to the invention, elements 20 of the zigzag pattern 18 are composed of a soft ferromagnetic material, like permalloy, having low coercivity and high permeability. The other linear segments 22 (stippled in FIG. 1) are composed of a hard ferromagnetic material having high coercivity, that, a high degree of opposition to changing its magnetic state or polarity.

Figure 3:
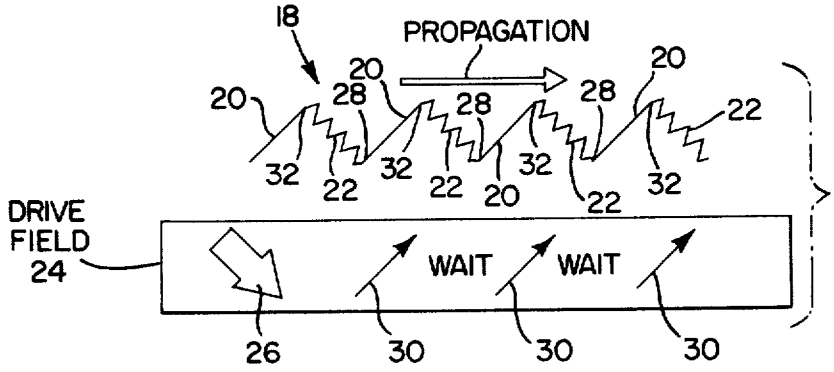
FIG. 3 is a schematic diagram illustrating the zigzag circuit of FIG. 1 with its drive field.

In FIG. 3 the zigzag circuit of FIG. 1 is represented schematically, the soft magnetic elements 20 being symbolized by straight lines and hard magnetic elements 22 by sawtooth lines. In operation, a pulsed magnetic drive field 24 initially applies a "giant" magnetic drive field pulse 26 in the plane of the overlay having a component parallel to the orientation of the hard magnetic elements 22 sufficiently strong to switch the polarity of the magnetization of the elements 22 in one direction. Because of the hard magnetic properties of the elements 22, when the giant pulse 26 ceases, these elements will retain their given common polarity and form attracting poles for bubbles, for example, at the lower vertices 28 of the zigzag circuit 18, as shown in FIG. 3. The zigzag circuit 18 at this point is in condition for propagation by means of intermittent drive field pulses 30 aligned with the soft magnetic elements 20. During application of the lower amplitude pulse 30, the soft magnetic elements 20 respond by forming temporary strong magnetic poles at the upper vertices 32 of the zigzag circuit 18. As a result, bubbles formerly occupying positions at the lower vertices 28 of the circuit are drawn along the soft magnetic elments 20 to the upper vertices 32. When the intermittent pulse 30 ceases, the temporary poles formed in the soft magnetic elements 20 disappear and each bubble traverses the next hard magnetic element 22 to the relatively permanent, lower strength poles which remains at each lower vertex 28 of the zigzag circuit 18.

To overcome the attraction of the relatively constant magnetic poles at the lower vertices 28 of the circuit 18, it is necessary to select materials and field strengths such that the temporary poles formed at the upper vertices 32 in the soft magnetic material are stronger than the constant poles in the hard magnetic elements. The circuit operation is dramatized by the slope and cliff analogy which refers to the manner in which the bubbles are drawn up the soft magnetic elements 20 by the intermittent field pulses 28 and then allowed to fall down the length of the hard magnetic elements 22. For a given circuit, this ratchet-like operation requires periodic drive field pulses preferably of uniform amplitude and direction once the polarity of the hard elements 22 has been established.

Figure 4:
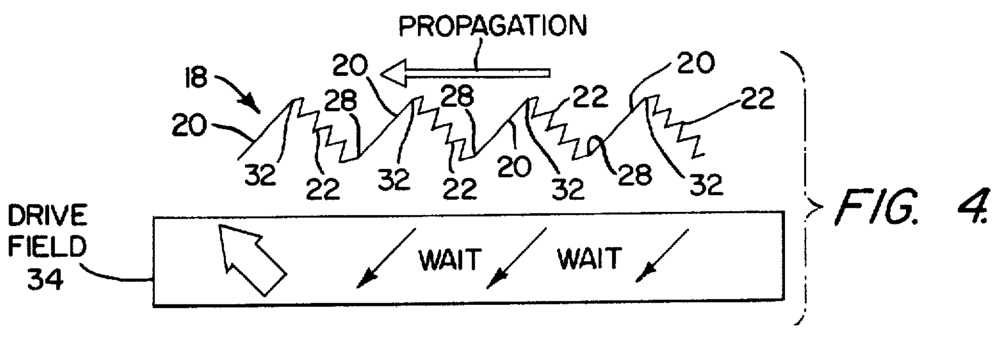
FIG. 4 is a schematic diagram illustrating the zigzag circuit of FIG. 1 with an alternative drive field.

FIG. 4 illustrates analogous propagation in the opposite direction using the same zigzag circuit 18 driven by a drive field system 34 consisting of giant and periodic pulses in the opposite directions from those in the drive field system 24 of FIG. 3.

Figure 5:
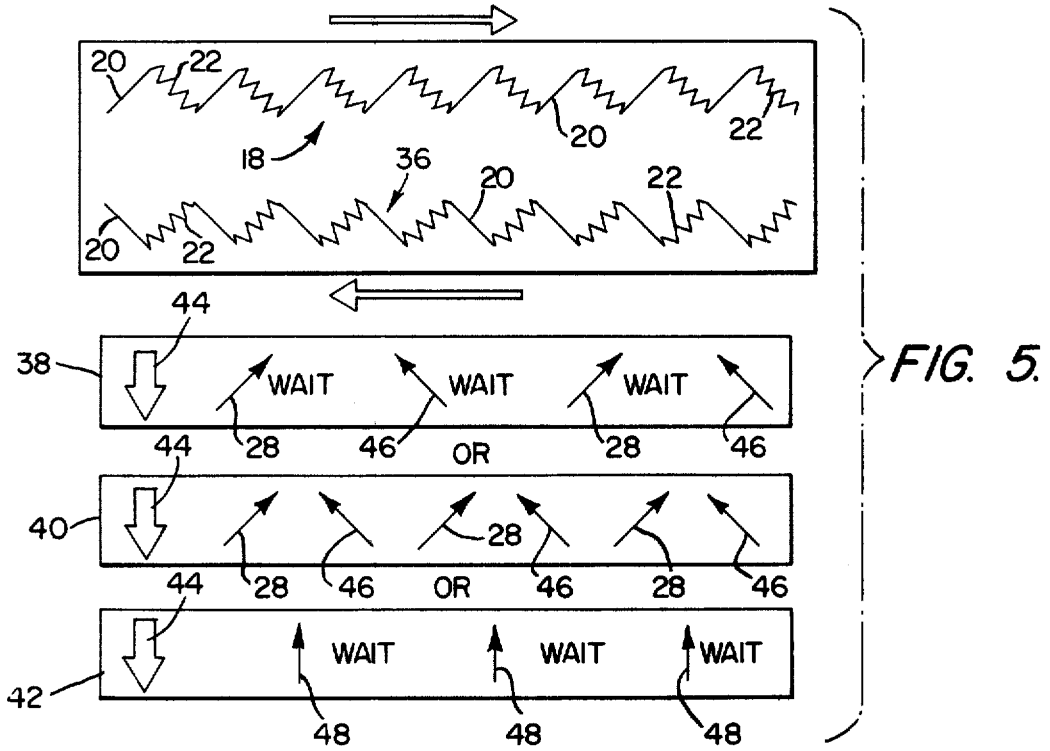
FIG. 5 is a schematic circuit illustrating a pair of different parallel zigzag circuits with three alternative drive field arrangements for driving both circuits simultaneously.

In FIG. 5 a zigzag circuit 36 parallel to the circuit 18 is formed by interchanging the hard and soft elements of the circuit 18 such that the hard elements 22 in the circuit 36 are parallel to the soft elements 20 of the circuit 18. Three different drive field systems 38, 40 and 42 can be used to drive bubbles on circuit 18 and 36 of FIG. 5 simultaneously in opposite directions. In the drive field system 38 a giant pulse 44 is initially applied to establish the polarity of the hard magnetic elements 22 in both circuits 18 and 36. While the giant pulse 44 is not aligned with the elements 22 of either circuit 18 or 36, it is directed so as to have equal components parallel to the hard elements of both circuits and of sufficient magnitude to switch the polarity of these elements to a given direction. In FIG. 5 application of the giant pulse 44 will cause relatively permanent poles to be established at the lower vertices of both zigzag circuits 18 and 36. The periodic propagation field in drive field system 38 includes alternate pulses 28 and 40 parallel with elements 20 of circuits 18 and 36 respectively. Alternate applications of the pulses 28 and 46 cause the formation of temporary, strong attracting poles at the upper vertices of the respective circuits 18 and 36. Intermittent application of the pulse 28 has no effect on the circuit 36 even though pulse 28 is aligned with the hard magnetic elements 22 of the circuit 36 because the field strength of the pulse 28 is insufficient to switch the polarity of the hard magnetic elements 22. Likewise alternate application of the pulse 46 is ignored by the circuit 18. The pause (wait) indicated in drive field system 38 between alternate applications of pulses 28 and 46 can thus be dispensed with as shown in the next drive field system 40 of FIG. 5. In using the system 40, the bubbles attracted to the upper vertices of circuit 18 fall to the lower vertices during application of the pulse 46. Similarly, bubbles attracted to the upper vertices of the circuit 36 by pulse 46 fall to the lower vertices of that circuit during each application of the pulse 28. In the last drive field system 42, a similar giant pulse 44 is used to establish the polarity of the hard magnetic elements 22, and the periodic drive field consists of pulses 48 in a direction opposite to that of the giant pulse 44. The periodic pulses 48 correspond to the resultant field which would be presented if drive field pulses 28 and 46 of the systems 38 and 40 were applied at once. Just as the giant pulse 44 influences the hard magnetic elements of both circuits 18 and 36, the periodic pulses 48 simultaneously influence the soft magnetic elements of both circuits. Thus, during application of the drive field 48, temporary magnetic poles are formed at the upper vertices at both circuits. The field strength of the pulses 48 is chosen such that equal components are parallel to elements 20 of both circuits 18 and 36. It is necessary in the case of drive field system 42 to insert a pause between the application of each pulse 48 to allow the bubbles on both circuits 18 and 36 to descend to the lower vertices under the attraction of the undisturbed poles of the hard elements. The relative direction of propagation in the circuits 18 and 36 can be reversed with the drive field systems 38, 40 and 42 of FIG. 5 in the same manner as shown in FIG. 4, i.e., by reversing each pulse.

Figure 6:
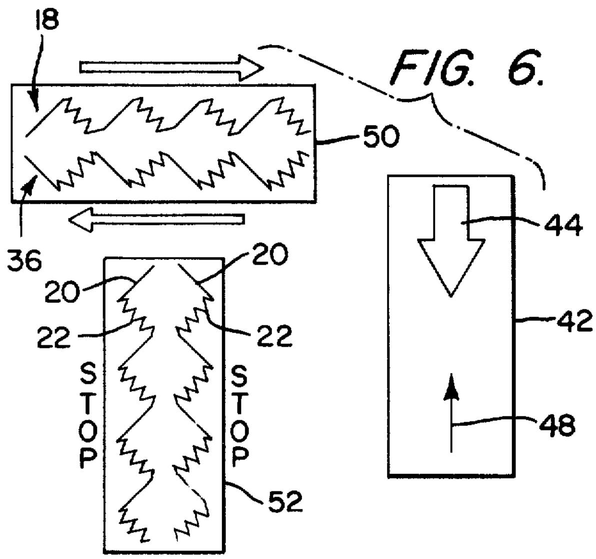
FIGS. 6, 7, 8 and 9 are schematic and block diagrams illustrating mutually exclusive operations of orthogonal zigzag circuits with different drive fields respectively.

In FIG. 6 "horizontal" zigzag circuits 18 and 36 are represented together by the reference numeral 50. A similar pair of "vertical" zigzag circuits 52 is arranged orthogonally with respect to the circuit pair 50. If the drive field system 42 of FIG. 5 using single, composite periodic pulses 48, is applied to the circuits 50 and 52, the horizontal circuits 50 propagate in opposite directions as shown in FIG. 5. However, the vertical circuits 52, orthogonal to circuits 50, are inoperative in these fields. Although the giant pulse 44 switches the polarity of the hard elements 22 in the vertical circuits 52, the periodic pulse 48 create temporary poles in the soft elements approximately coincident with those of the hard elements. Thus the periodic pulses 48 are in the wrong direction for bubble propagation in the vertical circuits 52.

Figure 7:
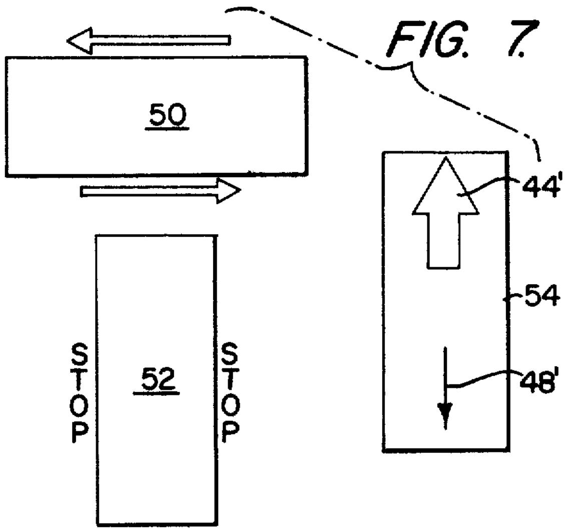

By reversing the giant pulse and periodic pulse directions in the drive field system 42 of FIG. 6, propagation on the horizontal circuits 50 is reversed, as would be expected from comparison with FIGS. 3 and 4, and the vertical circuits 52 remain ineffective to propagate bubbles, as indicated in FIG. 7 with drive field system 54.

Figure 8:
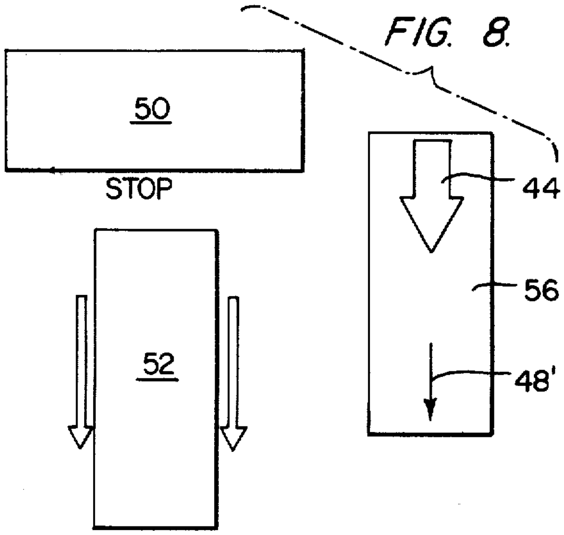
Figure 9:
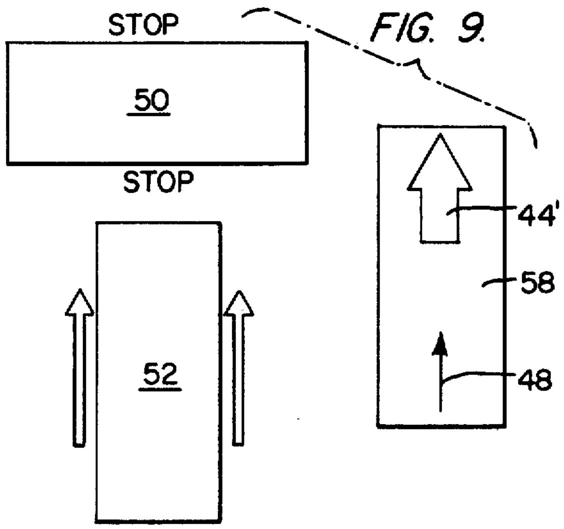

However, if the directions of the giant pulse and the periodic pulses in the same as shown for fields 56 and 58 in FIGS. 8 and 9, respectively, the vertical circuit pair 52 propagates in the same direction as the pulses while the horizonal circuit pair 50 is nonpropagating.

Although "vertical" drive field systems 42, 54, 56 and 58 are shown for circuit pairs 50 and 52 in FIGS. 6–9, corresponding "horizontal" drive fields (i.e., parallel to propagation in circuit pair 50 rather than 52) will operate these circuits in an analogous manner. In horizontal fields circuits 50 and 52 would behave like circuits 52 and 50, respectively, in vertical fields. Thus the result can be visualized by rotating the sheet of drawings 90°.

Figure 10:
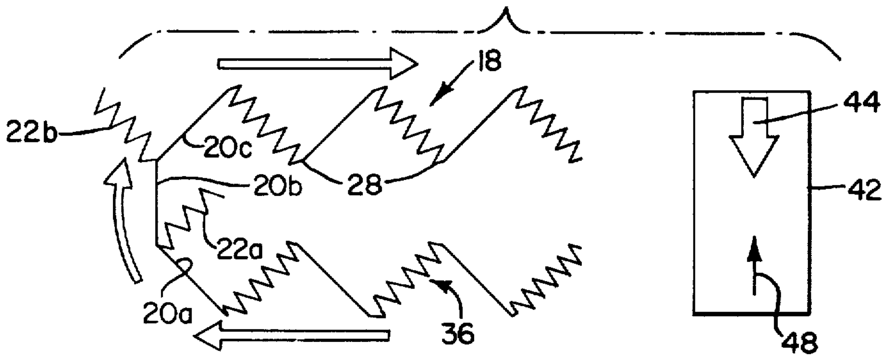
FIGS. 10, 11 and 12 are schematic drawings illustrating cornering elements for parallel zigzag circuits according to the invention.
Figure 11:
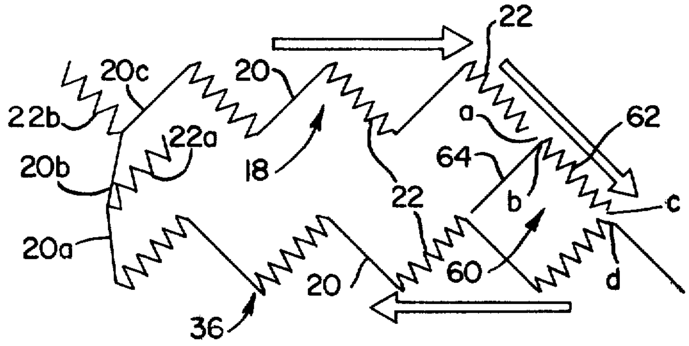
Figure 12:
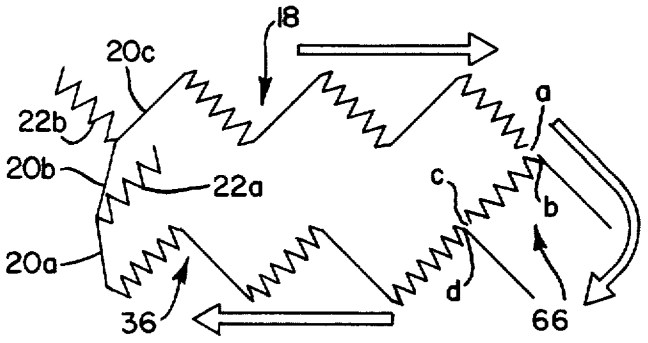

FIGS. 10, 11 and 12 illustrate cornering mechanisms or transfer elements between upper and lower parallel circuits 18 and 36 propgating in opposite directions under the control again of drive field system 42. In FIG. 10 transfer between circuits 18 and 36 is provided by consecutive soft magnetic segments 20*a*, 20*b* and 20*c*. The middle element 20*b* joins the adjacent ends of corresponding soft magnetic elements in the upper and lower circuits 18 and 36. The periodic pulses 48 produce poles at the corresponding upper ends of each soft magnetic segment 20*a*, 20*b* and 20*c*. The lower ends of special hard elements 22*a* and 22*b* are joined respectively to the junctions of soft elements 20*a* and 20*b*, and 20*b* and 20*c* to increase the pole strength. Thus these junctions will always have a residual pole strength. The temporary magnetization of the soft elements 20*a* and 20*b* due to the intermittent pulse 48 will be added to the residual pole strength. It should be noted in passing that this technique of pole enhancement can be utilized elsewhere and is not necessarily limited to hard-soft circuits. In fact, anywhere one needs to increase pole strength, a hard element can be joined at its attracting end to the desired circuit point to provide a residual pole, or to increase the residual pole strength, for example, by joining a vertical hard element at its lower end to any of the lower vertices 28 of circuit 18 (FIG. 10).

In FIGS. 11 and 12, circuits 18 and 36 are joined at both respective ends. The left-hand ends of the circuits 18 and 36 in FIGS. 11 and 12 are joined by means of a soft element 20*b* as in FIG. 10. The relative lateral positions of the circuits 18 and 36 in FIGS. 11 and 12 are different from the symmetrical relationship shown in FIG. 10. The circuits 18 and 36 are shifted with respect to each other in FIGS. 11 and 12 so that the upper vertices in circuit 18 are aligned with the upper vertices of circuit 36. Consequently, one or both of the elements 20*a* and 20*b* in FIGS. 11 and 12 are canted slightly to accommodate the relative shift in circuits 18 and 36.

The right-hand ends of circuits 18 and 36 in FIG. 11 are interconnected by means of a discrete, upside-down V-shaped element 60 composed of a hard magnetic segment 62 parallel to the hard elements 22 of the upper circuit 18 and a soft segment 64 parallel to the soft elements 20 of the upper circuit 18. The right-hand lower end of the hard segment 62 is juxtaposed with an upper vertex on the lower circuit 36. The vertex of the cornering element 60 is juxtaposed with the lower end of the last hard element 22 in the upper circuit 18. In operation, a bubble falling to position *a* at the free end of the last hard element 22 on the upper circuit 18 is attracted to position *b* at the vertex of the cornering element 60 on the next application of the periodic pulse 48. During the subsequent pause between pulses 48, the bubble "relaxes" to the position *c* at the free end of the hard segment 62 of the cornering element 60, and with next periodic pulse 48 the bubble is placed on the lower circuit 36 at position *d*.

In FIG. 12 an analogous arrangement is shown for interconnecting the right-hand ends of the circuits 18 and 36 by means of a special cornering element 66 in which the hard and soft elements are interchanged with respect to the element 60 of FIG. 11. Consecutive bubble positions are indicated by the letters *a*, *b*, *c* and *d*, and the operation is similar to that of the cornering element 60 in FIG. 11.

In the above disclosure a field-accessed bubble propagation system is thus presented which permits bubble propgation in parallel channels in opposite directions under the control of a periodic low amplitude drive field pulse of uniform amplitude and direction. The propagation direction is reversed simply by reversing the periodic field pulses after resetting the polarity of the hard magnetic elements. Mutually exclusive circuits have been shown in the form of orthogonal, continuous zigzag circuits, and special cornering elements allow the construction of interconnected circuits to form serpentine shift registers or recirculating closed loops.

The invention may be embodied in many different forms without departing from its essential principles. For example, the retentivity of the soft magnetic elements in a zigzag hard-soft overlay circuit may in certain cases be sufficiently strong relative to the retained magnetization of the hard elements that it will be necessary to apply a brief demagnetization pulse with a sufficiently strong component aligned with the soft magnetic elements to reduce the flux to a lower level where the bubble would be more inclined to seek the attracting pole of the hard element. In addition, the means for applying a giant pulse can, if desired, be separate from the means for applying the periodic pulses. For example, the giant pulses can be applied by conductor loops on the bubble chip adjacent to each hard magnetic element. The specific embodiments described above are therefore intended to be illustrative and restrictive, the scope of the invention being indicated by the appended claims and all variations within the range of equivalence are intended to be encompassed therein.

I claim:

1. A magnetic bubble propagation system, comprising a sheet of magnetic bubble material, means for producing and maintaining bubbles therein, a ferromagnetic overlay circuit operatively disposed on said sheet for moving said bubbles including a repetitive pattern of elongated elements of different coercivity, elements of higher coercivity having poles which attract bubbles at respective ends of said elements corresponding to the direction of propagation, and means for generating an intermittent pulsed drive field in the plane of said sheet having sufficient amplitude parallel to elements of lower coercivity to form stronger poles than those retained by said elements of higher coercivity and of insufficient amplitude parallel to said elements of higher coercivity to switch the polarity thereof, said circuit being responsive to said intermittent drive field such that during application of said drive field bubbles are drawn to attracting pole positions at corresponding one ends of corresponding elements of lower coercivity and in each pause between application of said drive field bubbles are drawn to the attracting poles retained by said elements of higher coercivity.

2. A hard-soft magnetic bubble propagation system, comprising a sheet of magnetic bubble material, means for producing and maintaining bubbles therein, a ferromagnetic overlay circuit operatively disposed on said sheet for moving said bubbles including a first repetitive pattern of ferromagnetic overlay elements of high and low coercivity, said elements with high coercivity all having a predeterminable polarity corresponding to the direction of propagation, and means for generating an intermittent drive field pulse in the plane of said sheet having insufficient amplitude parallel to said elements of high coercivity to switch their polarity and having sufficient amplitude parallel to corresponding temporary poles therein of greater strength than those retained by said elements of high coercivity, said circuit pattern being responsive to said intermittent drive field such that bubbles are drawn to said temporary poles in said elements of low coercivity during application of said drive field pulse and in the pauses between application of said drive field pulse bubbles are drawn to the poles retained by said elements of high coercivity, said operation being repetitive such that bubbles are propagated along said circuit pattern.

3. The propagation system of claim 2, wherein said elements of high and low coercivity are arranged alternately end-to-end.

4. The propagation system of claim 3, wherein said elements are interconnected end-to-end so as to form a continuous overlay pattern.

5. The propagation system of claim 4, wherein said elements of like coercivity are parallel.

6. The propagation system of claim 5, wherein said repetitive pattern is in a zigzag form.

7. The propagation system of claim 5, further comprising means for generating a drive field pulse in the plane of said sheet having sufficient amplitude parallel to said elements of high coercivity to polarize them in one direction corresponding to the direction of propagation before applying said intermittent drive field pulses.

8. The propagation system of claim 2, wherien said ferromagnetic overlay pattern includes a second repetitive pattern for moving bubbles parallel to the direction in which they are moved by said first repetitive pattern, said second repetitive pattern being similarly composed of elements of high and low coercivity, said second repetitive pattern being so arranged that said drive field pulse is of sufficient amplitude parallel to the elements of low coercivity in said second repetitive pattern to form temporary poles therein of stronger magnitude than the poles retained by said elements of high coercivity and of insufficient amplitude parallel to said elements of high coercivity to switch their polarity, said second repetitive pattern being responsive to said intermittent drive field pulse for propagating bubbles in a repetitive fashion in the opposite direction to that of said first repetitive pattern.

9. The propagation system of claim 8, further comprising means for generating a single pulse of sufficient amplitude parallel respectively to the elements of high coercivity in both said repetitive patterns to switch their polarity to directions corresponding to the respective directions of propagation on said two patterns simultaneously.

10. The propagation system of claim 8, wherein said repetitive patterns are each composed of a zigzag pattern of alternate ones of said elements of high and low coercivity interconnected end-to-end.

11. The propagation system of claim 2, wherein said overlay pattern includes a second repetitive pattern for moving bubbles parallel to the direction in which they are moved by said first repetitive pattern, said second repetitive pattern being similarly composed of elements of high and low coercivity, said generating means producing another intermittent drive field pulse in the plane of said sheet, said second repetitive pattern being so arranged that said other drive field pulse is of sufficient amplitude parallel to the elements of low coercivity in said second repetitive pattern to form temporary poles therein of stronger magnitude than the poles retained by said elements of high coercivity in said second pattern and of insufficient amplitude parallel to said elements of high coercivity in said second pattern to switch their polarity, said second repetitive pattern being responsive to said other intermittent drive field pulse for propagating bubbles in a repetitive fashion in the opposite direction to that of said first repetitive pattern.

12. The propagation system of claim 11, wherein said generating means produces said one and said other intermittent drive field pulses alternately.

13. Mutually exclusive hard-soft magnetic bubble propagation circuits, comprising a sheet of magnetic bubble material, means for producing and maintaining bubbles therein, a ferromagnetic overlay operatively disposed on said sheet for moving said bubbles including first and second orthogonal propagation channels each defined by a repetitive pattern of elements arranged end-to-end alternatively of high and low coercivity, elements of like coercivity in the same channel being parallel to each other, means for generating a single initial drive field pulse in the plane of said sheet of sufficient amplitude parallel to elements of high coercivity in both of said channels respectively to polarize said elements of high coercivity in corresponding directions, and means for generating an intermittent drive field pulse of uniform amplitude and direction in the plane of said sheet having sufficient amplitude parallel to said elements of low coercivity to establish temporary poles therein of greater strength than the poles retained by said elements of high coercivity but of insufficient amplitude parallel to said elements of high coercivity to switch their polarity, said intermittent drive field pulse repetitively assuming consistently one or the other of two different directions, said first channel being responsive to said intermittent drive field pulses of only one of said two directions for propagating bubbles in a predetermined direction along said first channel, and said second channel being responsive to said intermittent drive field pulses for propagating bubbles in a predetermined direction only when said drive field pulses are in the other of said two directions.

14. The propagation system of claim 11, wherein said first and second directions for said intermittent drive field pulses are opposite.

15. A mutually exclusive magnetic bubble hard-soft propagation system, comprising a sheet of magnetic bubble material, means for producing and maintaining bubbles therein, a ferromagnetic overlay circuit pattern operatively disposed on said sheet for moving said bubbles including first and second orthogonal propagation channels each composed of a repetitive pattern of overlay elements of different coercivity, means for generating an initial drive field pulse in a predetermined direction in the plane of said sheet having sufficient amplitude parallel to said elements of higher coercivity in said first and second channels to establish the polarity thereof such that in each channel the polarity of said elements of higher coercivity coresponds to a respective direction of propagation, and means for generating an intermittent drive field pulse of uniform amplitude and direction consistently in one or the other of two possible directions in the plane of said sheet, the elements in each channel being arranged such that propagation in said first channel takes places in response to said intermittent drive field pulses only when they are in one of said two directions and in said second channel propagation takes place in response to said intermittent drive field pulses only when they are in the other of said two directions.

16. Mutually exclusive hard-soft magnetic bubble circuits, comprising a sheet of magnetic bubble material, means for producing and maintaining bubbles therein, a ferromagnetic overlay pattern operately disposed on said sheet for moving said bubbles including first and second orthogonal propagation channels each defined by a repetitive pattern of elements of varying coercivity, and means for generating drive fields in the plane of said sheet according to a plurality of different sequences of field strengths and orientations, the elements in said first and second channels being so arranged relative to said drive fields that in said first channel propagation takes place in response to said drive field only when it is generated in accordance with any one of a first subset of said plurality of sequences, and in said second channel propagation takes place in response to said drive field only when it is generated in accordance with any one of a second subset of said plurality of sequences, said first and second subsets being mutually exclusive.

* * * * *